United States Patent
Diamanti et al.

(10) Patent No.: US 10,783,141 B2
(45) Date of Patent: Sep. 22, 2020

(54) NATURAL LANGUAGE PROCESSING SOCIAL-BASED MATRIX REFACTORIZATION

(71) Applicant: INTERNATIONAL BUSINESS MACHINES CORPORATION, Armonk, NY (US)

(72) Inventors: Gary F. Diamanti, Wake Forest, NC (US); Mauro Marzorati, Lutz, FL (US); Aaron K. Baughman, Silver Spring, MD (US); Iwao Hatanaka, Acton, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 205 days.

(21) Appl. No.: 15/957,218

(22) Filed: Apr. 19, 2018

(65) Prior Publication Data
US 2019/0325050 A1 Oct. 24, 2019

(51) Int. Cl.
*G06F 16/2453* (2019.01)
*G06F 16/248* (2019.01)
*G06F 16/2457* (2019.01)
*G06F 40/30* (2020.01)
*G06F 40/284* (2020.01)

(52) U.S. Cl.
CPC ...... *G06F 16/24534* (2019.01); *G06F 16/248* (2019.01); *G06F 16/24578* (2019.01); *G06F 40/284* (2020.01); *G06F 40/30* (2020.01)

(58) Field of Classification Search
None
See application file for complete search history.

(56) References Cited

U.S. PATENT DOCUMENTS

| | | | |
|---|---|---|---|
| 9,213,771 B2 | 12/2015 | Chen et al. | |
| 9,606,934 B2 | 3/2017 | Acar et al. | |
| 2011/0004588 A1* | 1/2011 | Leitersdorf | G06F 16/951 707/711 |
| 2012/0311519 A1 | 12/2012 | Kennaley | |
| 2013/0091170 A1 | 4/2013 | Zhang et al. | |

(Continued)

OTHER PUBLICATIONS

Vicedo et al., "A semantic approach to Question Answering systems", http://trec.nist.gov/pubs/trec9/papers/alicante_trec_9_papers.pdf., 2000, 6 pages.

(Continued)

*Primary Examiner* — Robert W Beausoliel, Jr.
*Assistant Examiner* — Cheryl M Shechtman
(74) *Attorney, Agent, or Firm* — Scott Dobson; Andrew D. Wright; Roberts Calderon Safran & Cole, P.C.

(57) ABSTRACT

A method includes: receiving, by a computing device, an initial question from a first user device; receiving, by the computing device, a plurality of additional questions from a plurality of additional user devices; decomposing, by the computing device, the initial question and each of the plurality of additional questions using natural language processing; determining, by the computing device, an overall ranking for each of a plurality of words in the plurality of decomposed questions; and generating, by the computing device, a new question by combining words based on the overall ranking.

20 Claims, 4 Drawing Sheets

(56) References Cited

U.S. PATENT DOCUMENTS

| | | | | |
|---|---|---|---|---|
| 2015/0074095 A1* | 3/2015 | Enders | ............. | G06F 16/24578 |
| | | | | 707/725 |
| 2015/0339590 A1* | 11/2015 | Maarek | .................. | H04L 67/02 |
| | | | | 706/12 |
| 2016/0092792 A1* | 3/2016 | Chandrasekaran | ......................... | |
| | | | | G06F 16/24578 |
| | | | | 706/12 |
| 2017/0161619 A1 | 6/2017 | Franceschini et al. | | |
| 2017/0220652 A1* | 8/2017 | Kazi | .................... | G06F 16/248 |
| 2017/0323204 A1* | 11/2017 | Akbulut | ................ | G06F 16/334 |

OTHER PUBLICATIONS

Anonymous, "Self-diagnosing natural language QA system that improves itself based on facial feature tracking", http://ip.com/IPCOM/000241901D, Jun. 5, 2015, 3 pages.

Anonymous, "Natural Language Semantics in Support of Knowledge Base Searching and Computer Aided Troubleshooting", http://ip.com/IPCOM/000246121D, May 10, 2016, 7 pages.

Anonymous, "Method and System for Automatically Refining a Set of Search Results using Natural Language Processing", http://ip.com/IPCOM/000239536D, Nov. 13, 2014, 4 pages.

Anonymous, "Machine Learning to Select Input Language on a Software Keyboard", http://ip.com/IPCOM/000252083D, Dec. 15, 2017, 36 pages.

Jiang et al., "Trust Calculation Model Based on Social Network and Evidence Theory," 2011 International Joint Conference on Service Sciences, Taipei, 2011, 3 pages.

\* cited by examiner

NATURAL LANGUAGE PROCESSING SOCIAL-BASED MATRIX REFACTORIZATION

BACKGROUND

The present invention generally relates to computing devices and, more particularly, to methods and systems for natural language processing.

Natural language processing (NLP) systems are used to process natural language data. NLP processing is used for many purposes, including speech recognition, text-to-speech, natural language understanding, and question answering, among others. NLP systems are being deployed and used at scale with hundreds of simultaneous users. An NLP system that performs question answering may use iterative deepening to reformulate questions based on knowledge returned from a NLP system.

SUMMARY

In a first aspect of the invention, there is a method that includes: receiving, by a computing device, an initial question from a first user device; receiving, by the computing device, a plurality of additional questions from a plurality of additional user devices; decomposing, by the computing device, the initial question and each of the plurality of additional questions using natural language processing; determining, by the computing device, an overall ranking for each of a plurality of words in the plurality of decomposed questions; and generating, by the computing device, a new question by combining words based on the overall ranking.

In another aspect of the invention, there is a computer program product that includes a computer readable storage medium having program instructions embodied therewith. The program instructions are executable by a computing device to cause the computing device to: receive an initial question from a first user device; receive a plurality of additional questions from a plurality of additional user devices; decompose the initial question and each of the plurality of additional questions using natural language processing; determine an overall ranking for each of a plurality of words in the plurality of decomposed questions; and generate a new question by combining words based on the overall ranking.

In another aspect of the invention, there is a system that includes: a hardware processor, a computer readable memory, and a computer readable storage medium associated with a computing device; program instructions of a question receiver configured to receive an initial question from a first user device and a plurality of additional questions from a plurality of additional user devices; program instructions of a question decomposer configured to decompose the initial question and each of the plurality of additional questions received by the question receiver using natural language processing; and program instructions of a social refactorer configured to determine an overall ranking for each of a plurality of words in the plurality of questions decomposed by the question decomposer and generate a new question by combining words based on the overall ranking, wherein the program instructions are stored on the computer readable storage medium for execution by the hardware processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
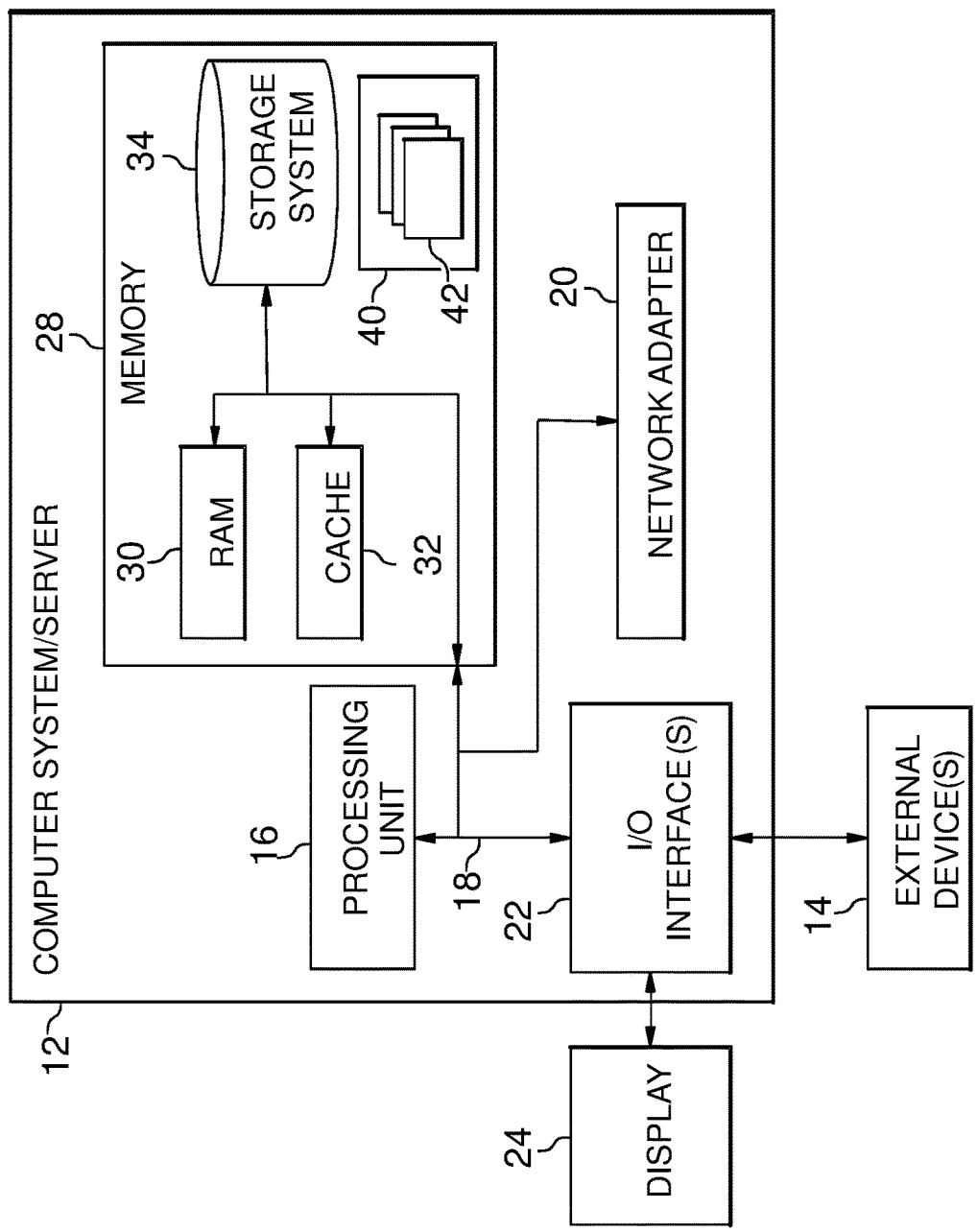
FIG. 1 depicts a computer system in accordance with aspects of the invention.

The present invention generally relates to computing devices and, more particularly, to methods and systems for natural language processing. Aspects of the invention decompose keyword searches between users using natural language processing into additional matrices to find hidden relationships and the highest-ranking words/content, unlocking key hidden patterns among users. High-ranking words or content are then used to feed back into the system to create additional queries and input to the system (e.g., using an iterative deepening technique).

An additional facet to augment the hidden relationships of meaning is introduced by the concept of "slang" and cultural-specific semantics. These semantic attributes can provide significant insight to unlock the real meaning of a question being posed. With more and more slang words and phrases being created and used every day, understanding how to interpret this in natural language processing systems is important. Aspects of the invention use contextual differences to perform parallel searches, unlocking and exposing hidden meanings and relationships that may be used to train the system in a way that increases both the scope and accuracy of its results. In addition, relationships may be further refined by introducing a time-weighted slang index as an additional dimension to the matrices to unlock additional relevance for improving the quality and accuracy of the returned answers. By using additional matrices, the system enables faster learning, exploiting trends.

As described herein, aspects of the invention include a method and system for improving question answering in a natural language processing system using matrix refactorization and accounting for slang/cultural specific semantics by collecting questions provided to the natural language processing system from a plurality of unique users with ranking of words/content from each user, creating overall rankings for words in the questions based on matrix refactorization of the questions and the user rankings of words/content and further based on slang/cultural specific semantics, creating new queries by combining the highest ranking parts of user questions, and processing the new queries by the natural language processing system. Additionally, aspects of the invention determine how likely a user is to search with a particular natural language question given the user's historical searches and other users' searches. Aspects of the invention also include an evidence-based system that finds related searches, generates a candidate hypothesis based on the related searches, and presents additional information determined to be relevant to the user's questions based upon the candidate hypothesis.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
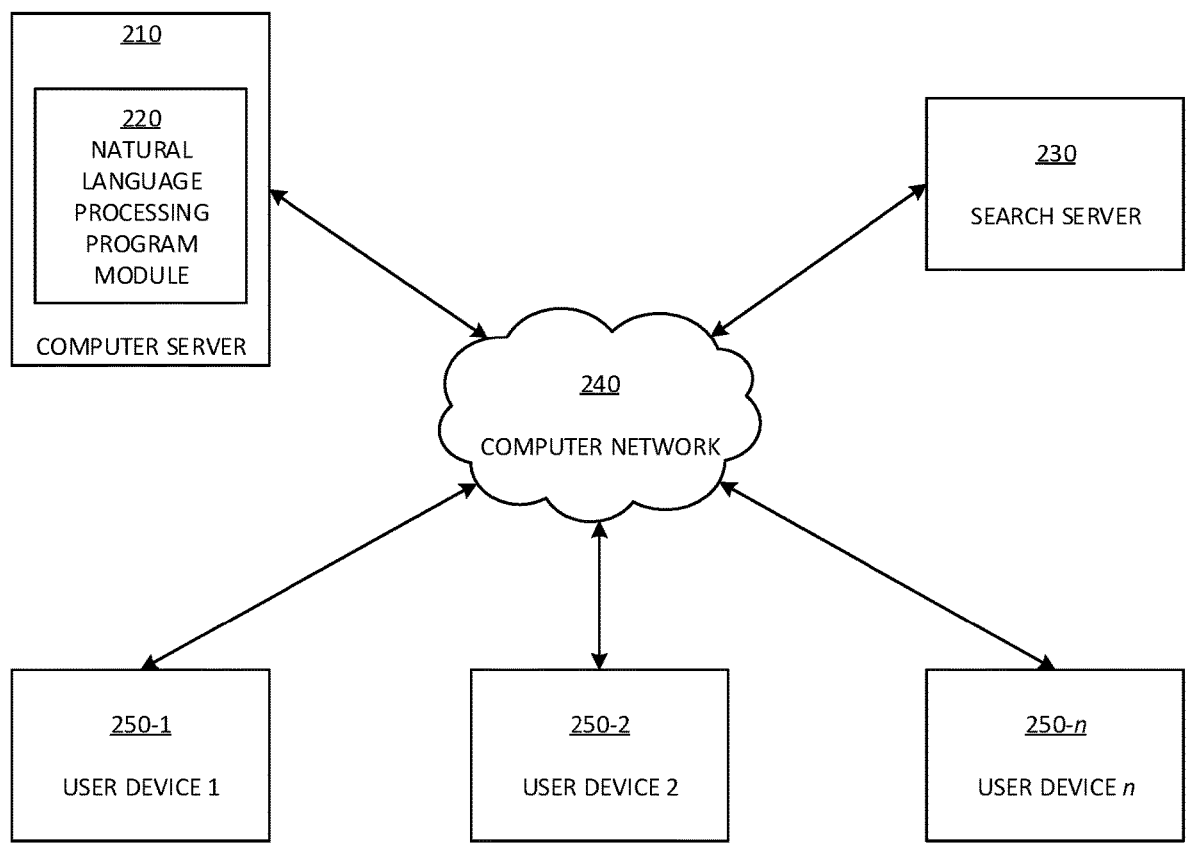
FIG. 2 depicts an illustrative environment in accordance with aspects of the invention.

FIG. 2 depicts an illustrative environment 200 in accordance with aspects of the invention. As shown, the environment 200 comprises a computer server 210 which is in communication with a search server 230 via a computer network 240. The environment 200 may also comprise a plurality of user devices, including user device 1 250-1, user device 2 250-2, and user device n 250-n, each of which is in communication with the computer server 210 and/or the search server 230 via the computer network 240. The computer network 240 may be any suitable network such as a LAN, WAN, or the Internet. The computer server 210, the search server 230, the user device 1 250-1, the user device 250-2, and the user device n 250-n may be physically collocated, or may be situated in separate physical locations.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200.

In embodiments, the computer server 210 may be a computer server 12 as shown in FIG. 1. The computer server 210 may be implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, the computer server 210 may include a natural language processing program module 220, which may include hardware and/or software and may be one or more of the program modules 42 shown in FIG. 1. According to an embodiment, the natural language processing program module 220 includes program instructions for performing natural language processing, including social-based matrix refactorization. The program instructions included in the natural language processing program module 220 of the computer server 210 may be executed by one or more hardware processors. According to an embodiment, the natural language processing program module 220 performs functions related to improving question answering in a natural language processing system using matrix refactorization and accounting for slang/cultural specific semantics.

Still referring to FIG. 2, in embodiments, the search server 230 may be a computer server 12 as shown in FIG. 1. The search server 230 may be implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, the search server 230 may receive search requests from one or more of the user device 1 250-1, the user device 250-2, and the user device n 250-n, either directly or via the computer server 210. The search server 230 may process the received search requests and return search results responsive to the search requests to the requesting user devices (e.g., one or more of the user device 1 250-1, the user device 250-2, and the user device n 250-n), either directly or via the computer server 210.

The search server 230 may receive search requests in any format and may provide the search results in any format. For example, the search request may be a question in a text format. Additionally, the search server 230 may provide hyperlinks, full documents or other media files, or excerpts from documents or media files as the search results (e.g., answers to the question). The search server 230 may be hosted by or provided by a third party. For example, the search server 230 may be provided as a web service.

Still referring to FIG. 2, in embodiments, each of the user device 1 250-1, the user device 2 250-2, and the user device n 250-n may be a computer system 12 as shown in FIG. 1. The user device 1 250-1, the user device 2 250-2, and the user device n 250-n may be desktop computers, laptop computers, tablets, smartphones, wearable devices, or any other type of computing device.

Figure 3:
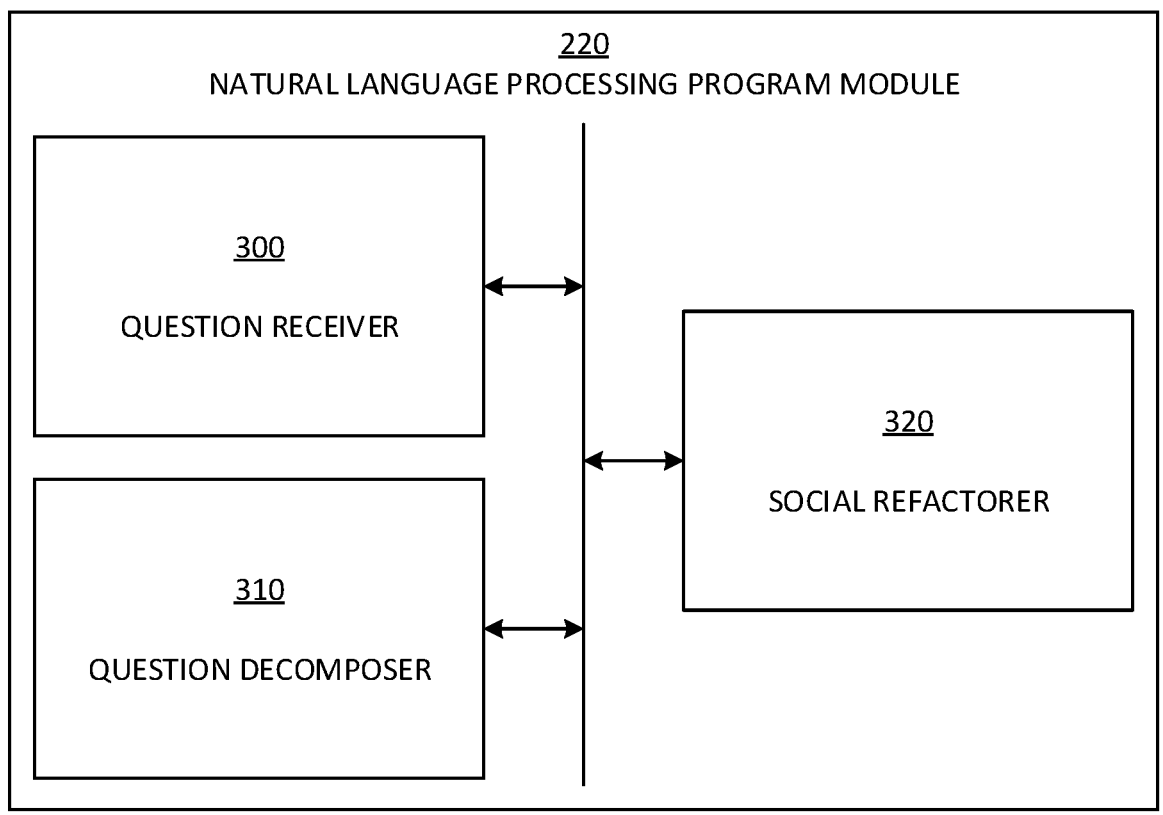
FIG. 3 depicts a block diagram of an exemplary program module in accordance with aspects of the invention.

FIG. 3 depicts a block diagram of an exemplary natural language processing program module 220 in the server 210 (of FIG. 2) in accordance with aspects of the invention. In embodiments, the natural language processing program module 220 includes a question receiver 300, a question decomposer 310, and a social refactorer 320, each of which may comprise one or more program modules 42 as described with respect to FIG. 1. In embodiments, the natural language processing program module 220 may include additional or fewer components than those shown in FIG. 3. In embodiments, separate components may be integrated into a single computing component or module. Additionally, or alternatively, a single component may be implemented as multiple computing components or modules.

In embodiments, the question receiver 300 receives a current question from the search server 230 or another device connected to or accessible through the computer network 240, such as the user device 1 250-1, the user device 2 250-2, or the user device n 250-n. The current question may be a question provided by a user via the user device 1 250-1, the user device 2 250-2, or the user device n 250-n as a search request. The current question may be a string of text or may be audio (e.g., speech) that is converted to text by the computer server 210 or the search server 230.

Still referring to FIG. 3, in embodiments, the question decomposer 310 decomposes the current question received by the question receiver 300 by performing tokenization and vectorization (i.e., feature extraction). In particular, natural language processing techniques are used to generate a vector representation of the current question received by the question receiver 300, such as a document-term matrix or any other vector representation. The document-term matrix may include a ranking of each of the words in the current question.

The question decomposer 310 may use a bag-of-words model or any other model or natural language processing technique to perform the tokenization and vectorization of the current question received by the question receiver 300. The question decomposer 310 may store the vector representation of the current question (e.g., the document-term matrix) in a storage device associated with or accessible by the computer server 210, such as the storage system 34 of FIG. 1.

In embodiments, the question receiver 300 may receive additional questions provided by other users as search requests, for example, via the user device 1 250-1, the user device 2 250-2, or the user device n 250-n, and the question decomposer 310 may decompose these additional questions by performing tokenization and vectorization, generating vector representations of the additional questions (e.g., document-term matrices). The question receiver 300 may be configured to receive a predetermined number of additional questions (e.g., a predetermined number of questions previously submitted to the search server 230) or may be configured to receive all questions from a predetermined time window adjacent to the time of the current question. The question decomposer 310 may store these additional vector representations (e.g., additional document-term matrices) generated from the additional questions in the storage device associated with or accessible by the computer server 210, such as the storage system 34 of FIG. 1.

Still referring to FIG. 3, in embodiments, the social refactorer 320 uses the stored additional vector representations (e.g., additional document-term matrices) to refactor the vector representation (e.g., document-term matrix) generated by the question decomposer 310 for the current question received by the question receiver 300. In particular, the social refactorer 320 refactors questions from n number of unique users, capturing the highest-ranking words/content from each user.

The social refactorer 320 uses the matrix refactorization formula of $V=W*H$, where V is the document-term matrix (e.g., a document-term matrix generated by the question decomposer 310 for the current question received by the question receiver 310), W is the feature matrix (e.g., word ranking of the features by one or more ranking techniques including Google Rank, Lucene Rank, Twitter Rank, Facebook Rank, or any other ranking technique), and H is the question/priority weighting. In embodiments, the social refactorer 320 determines the feature of a word by its rank in the matrix W (e.g., a 10×1 matrix) and determines the rank of a word from the matrix H (e.g., a 1×10 matrix). The social refactorer 320 uses machine learning techniques to find the best weights H, and calculates V based on the weighting. Accordingly, the social refactorer 320 determines the overall ranking of nouns, verbs, and adverbs in the current question received by the question receiver 310.

In embodiments, the social refactorer 320 adds slang rankings as an additional dimension to the matrix W to determine additional relationships and unlock hidden meanings. The social refactorer 320 may also add the element of time to the ranking weight to optimize the time period in which the slang was most relevant or prolific. In other embodiments, a pre-processing step may be performed. In this case, the system may use the matrix refactorization formula of $V=W*H*S(time)$. In embodiments, the social refactorer 320 may use a slang dictionary with a word embedding technique.

In embodiments, the social refactorer 320 correlates any n number of user questions, weighting and ranking the components of each question as discussed above. The social refactorer 320 then correlates the highest-ranking nouns, verbs, and adverbs of multiple related questions, combining them together to form a new question. For example, the social refactorer 320 may correlate the highest-ranking words from related questions associated with two or three users to form the new question. The social refactorer 320 thereby generates a new question that may be provided to the search server 230 to obtain search results and additional information that may be relevant to the current question. The new question is then transmitted to the search server 230, which provides search results for the new question.

In embodiments, the social refactorer 320 may use machine learning techniques to compare the search results returned by the search server 230 for the new question to search results returned by the search server 230 for the original question to optimize the refactorization and tune the system.

Figure 4:
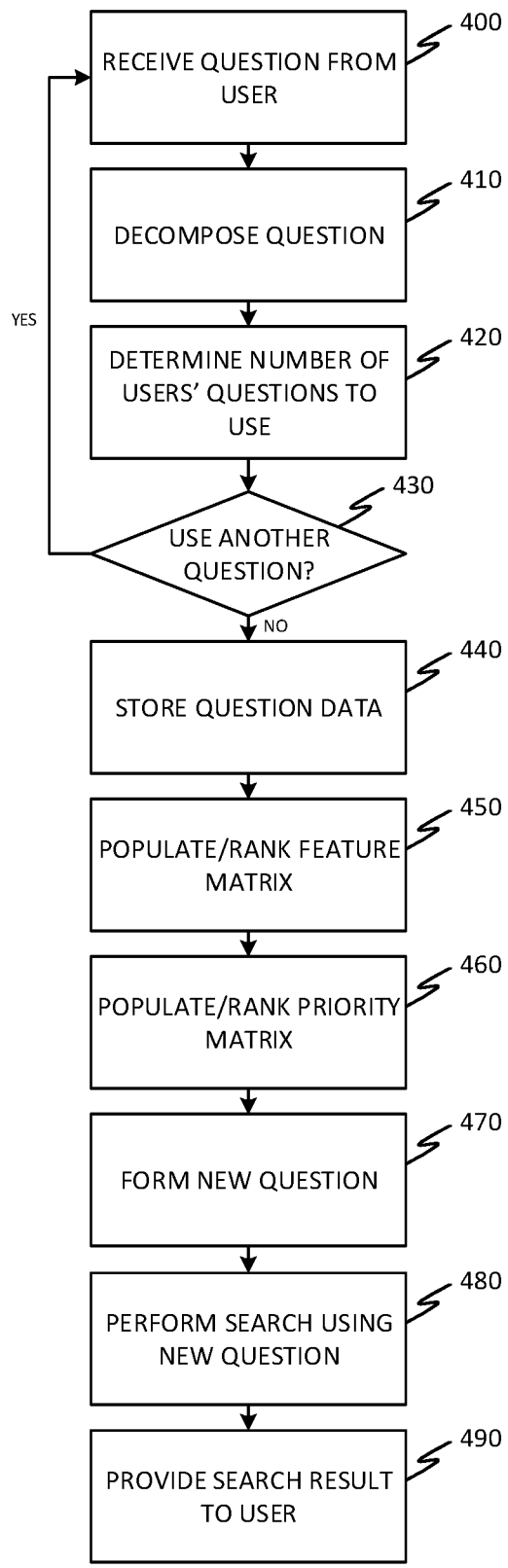
FIG. 4 depicts a flowchart of an exemplary method in accordance with aspects of the invention.

FIG. 4 depicts a flowchart of an exemplary method in accordance with aspects of the invention. The steps of the method may be performed in the environment of FIG. 2 and are described with reference to the elements and steps described with respect to FIGS. 1, 2, and 3.

At step 400, the system receives a question from a user. In embodiments, as described with respect to FIG. 3, step 400 comprises the question receiver 300 receiving a question from the search server 230 or another device connected to or accessible through the computer network 240, such as the user device 1 250-1, the user device 2 250-2, or the user device n 250-n.

At step 410, the system decomposes the question received at step 400. In embodiments, as described with respect to FIG. 3, step 410 comprises the question decomposer 310 performing tokenization and vectorization (i.e., feature extraction) on the question received by the question receiver 300.

At step 420, the system determines a number of users' questions to use in the refactoring. In embodiments, as described with respect to FIG. 3, step 420 comprises the question receiver 300 being configured to receive a predetermined number of additional questions (e.g., a predetermined number of questions previously submitted to the search server 230) or being configured to receive all questions from a predetermined time window adjacent to the time of the current question.

At step 430, the system determines whether or not to use another question. In embodiments, as described with respect to FIG. 3, step 430 comprises the question receiver 300 determining whether or not the predetermined number of additional questions has been received (or whether or not all questions from the predetermined time window have been received). If the system determines at step 430 that another question should be used, then the flow returns to step 400.

On the other hand, if the system determines at step 430 that another question should not be used, then the flow proceeds to step 440.

At step 440, the system stores the question data, for example, the document term matrix generated at step 410 for each question. In embodiments, as described with respect to FIG. 3, step 440 comprises the question decomposer 310 storing the document-term matrices in the storage device associated with or accessible by the computer server 210, such as the storage system 34 of FIG. 1.

At step 450, the system populates/ranks the feature matrix, using the document-term matrices stored at step 440. In embodiments, as described with respect to FIG. 3, step 450 comprises the social refactorer 320 populating the feature matrix W by using a word ranking of the features from the document-term matrices stored at step 440.

At step 460, the system populates/ranks the priority matrix, using the document-term matrices stored at step 440. In embodiments, as described with respect to FIG. 3, step 460 comprises the social refactorer 320 populating the priority matrix H by using the document-term matrices stored at step 440.

At step 470, the system forms a new question, using the feature matrix populated at step 450 and the priority matrix populated at step 460. In embodiments, as described with respect to FIG. 3, step 470 comprises the social refactorer 320 correlating the highest-ranking nouns, verbs, and adverbs of multiple questions, combining them together to form a new question, using the matrix refactorization formula of $V=W*H$.

At step 480, the system performs a search using the new question formed at step 470. In embodiments, step 480 comprises the computer server 210 sending the new question formed by the social refactorer 320 to the search server 230 as a search request.

At step 490, the system provides a result to the user for the search performed at step 480. In embodiments, step 490 comprises the search server 230 providing a search result to the user device 1 250-1, the user device 2 250-2, or the user device n 250-n, either directly or via the computer server 210.

Accordingly, the system improves the functioning of a computer by providing for improved natural language processing. Additionally, the system improves the functioning of a computer by providing the functionality of decomposing keyword searches between users into additional matrices to find hidden relationships. This improved functionality allows the computer to present additional information that may be relevant to the user's question. In particular, the system may receive a question from a user, perform automated (computer-based) question answering using these improved methods for natural language processing, and provide a result to the user. Additionally, the system uses techniques that are, by definition, rooted in computer technology (e.g., natural language processing and machine learning) that cannot be performed manually by a person.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
receiving, by a computing device, an initial question from a first user device;
receiving, by the computing device, a plurality of additional questions from a plurality of additional user devices;
decomposing, by the computing device, the initial question and each of the plurality of additional questions using natural language processing;
determining, by the computing device, an overall ranking for each of a plurality of words in the plurality of decomposed questions based on matrix refactorization of the plurality of decomposed questions, including determining features of each of the plurality of words based on a rank in a feature matrix and determining ranks of each of the plurality of words in a priority matrix; and
generating, by the computing device, a new question by combining words based on the overall ranking, wherein nouns, verbs, and adverbs of the plurality of additional questions having a highest ranking in the overall ranking are combined.

2. The method according to claim 1, further comprising:
performing a search using the new question; and
providing a result of the search to the first user device.

3. The method according to claim 1, wherein the decomposing the initial question and each of the plurality of questions comprises, for each question, performing tokenization and vectorization.

4. The method according to claim 3, wherein the decomposing the initial question and each of the plurality of questions further comprises, for each question, generating a document-term matrix.

5. The method according to claim 4, wherein the document-term matrix includes a ranking of each of a plurality of words in the question.

6. The method according to claim 1, wherein the determining the overall ranking for each of the plurality of words in the plurality of decomposed questions is further based on slang semantics.

7. The method according to claim 6, wherein the determining the overall ranking for each of the plurality of words in the plurality of decomposed questions further comprises using a time associated with the slang semantics.

8. The method according to claim 1, wherein the decomposing the initial question and each of the plurality of additional questions comprises using a bag-of-words model.

9. The method according to claim 8, wherein in the determining the overall ranking of each of the plurality of words in the plurality of decomposed questions, machine learning is used to determine weights in the priority matrix.

10. The method according to claim 9, wherein in the determining the overall ranking of each of the plurality of words in the plurality of decomposed questions, the matrix refactorization of the plurality of decomposed questions further comprises determining additional relationships using a slang dictionary with a word embedding technique and adding a time element based on a time period associated with slang.

11. A computer program product comprising a computer readable storage medium having program instructions embodied therewith, the program instructions executable by a computing device to cause the computing device to:
receive an initial question from a first user device;
receive a plurality of additional questions from a plurality of additional user devices;
decompose the initial question and each of the plurality of additional questions using natural language processing;
determine an overall ranking for each of a plurality of words in the plurality of decomposed questions based on matrix refactorization of the plurality of decomposed questions, including determining features of each of the plurality of words based on a rank in a feature matrix and determining ranks of each of the plurality of words in a priority matrix; and
generate a new question by combining words based on the overall ranking, wherein nouns, verbs, and adverbs of the plurality of additional questions having a highest ranking in the overall ranking are combined.

12. The computer program product according to claim 11, the program instructions further being executable by the computing device to cause the computing device to:
perform a search using the new question; and
provide a result of the search to the first user device.

13. The computer program product according to claim 11, wherein the decomposing the initial question and each of the plurality of questions comprises, for each question, performing tokenization and vectorization.

14. The computer program product according to claim 13, wherein the decomposing the initial question and each of the plurality of questions further comprises, for each question, generating a document-term matrix.

15. The computer program product according to claim 14, wherein the document-term matrix includes a ranking of each of a plurality of words in the question.

16. The computer program product according to claim 11, wherein the determining the overall ranking for each of the plurality of words in the plurality of decomposed questions is further based on slang semantics.

17. The computer program product according to claim 16, wherein the determining the overall ranking for each of the plurality of words in the plurality of decomposed questions further comprises using a time associated with the slang semantics.

18. A system comprising:
a hardware processor, a computer readable memory, and a computer readable storage medium associated with a computing device;
program instructions of a question receiver configured to receive an initial question from a first user device and a plurality of additional questions from a plurality of additional user devices;
program instructions of a question decomposer configured to decompose the initial question and each of the plurality of additional questions received by the question receiver using natural language processing; and
program instructions of a social refactorer configured to determine an overall ranking for each of a plurality of words in the plurality of questions decomposed by the question decomposer based on matrix refactorization of the plurality of questions decomposed by the question decomposer, including determining features of each of the plurality of words based on a rank in a feature matrix and determining ranks of each of the plurality of words in a priority matrix and generate a new question by combining words based on the overall ranking, wherein nouns, verbs, and adverbs of the plurality of additional questions having a highest ranking in the overall ranking are combined,
wherein the program instructions are stored on the computer readable storage medium for execution by the hardware processor via the computer readable memory.

19. The system according to claim 18, wherein the question decomposer is further configured to performing tokenization and vectorization on each question received by the question receiver.

20. The system according to claim 19, wherein the question decomposer is further configured to generate a document-term matrix.

* * * * *